United States Patent [19]
Hull

[11] Patent Number: 5,557,155
[45] Date of Patent: Sep. 17, 1996

[54] OPTIMIZATION OF SUPERCONDUCTING TILING PATTERN FOR SUPERCONDUCTING BEARINGS

[75] Inventor: John R. Hull, Hinsdale, Ill.

[73] Assignee: University of Chicago, Chicago, Ill.

[21] Appl. No.: 247,349

[22] Filed: May 23, 1994

[51] Int. Cl.$^6$ ........................................... H02K 7/09
[52] U.S. Cl. .................... 310/90.5; 505/166; 505/211
[58] Field of Search ................... 310/90.5, 156; 505/166, 211, 1

[56] References Cited

U.S. PATENT DOCUMENTS

| | | |
|---|---|---|
| 4,132,130 | 1/1979 | Schneider. |
| 4,870,310 | 9/1989 | Triplett ........................................ 310/74 |
| 4,886,778 | 12/1989 | Moon et al. ................................. 505/1 |
| 4,939,120 | 7/1990 | Moon et al. ................................. 505/1 |
| 4,961,352 | 10/1990 | Downer et al. ............................. 74/5.46 |
| 5,126,317 | 6/1992 | Agarwala et al. ........................... 505/1 |
| 5,177,387 | 1/1993 | McMichael et al. ....................... 310/90.5 |
| 5,214,981 | 6/1993 | Weinberger et al. ....................... 74/573 |
| 5,310,705 | 5/1994 | Mitlitsky et al. ........................... 505/211 |
| 5,312,130 | 5/1994 | Shibayama et al. ........................ 310/90.5 |
| 5,436,516 | 7/1995 | Yamazaki et al. .......................... 310/90.5 |

OTHER PUBLICATIONS

"Satellite Power Using a Magnetically Suspended Flywheel Stack," Kirk et al., *Journal of Power Sources*, vol. 22 (1988), pp. 301–311.

"Magnetic Forces in High–$T_c$ Superconducting Bearings," Moon, *Applied Electromagnetics in Materials*, vol. 1 (1990), pp. 29–35.

"High–Speed Rotation of Magnets on High $T_c$ Superconducting Bearings," Moon, et al., *Appl. Phys. Lett.*, vol. 56(4), Jan. 22, 1990, pp. 397–399.

"Rotor Dynamics of Flywheel Energy Storage Systems," Jayaraman, et al, *Journal of Solar Energy Engineering*, vol. 113, Feb. 1991, pp. 11–18.

"A New Process with the Promise of High $J_c$ in Oxide Superconductors," Murakami, et al., *Japanese Journal of Applied Physics*, vol. 28, No. 7, Jul. 1989, pp. 1189–1194.

"Levitation Forces, Relaxation and Magnetic Stiffness of Melt–Quenched YBa$_2$Cu$_3$O$_x$," Moon, et al., *Japanese Journal of Applied Physics*, vol. 29, No. 7, Jul. 1990, pp. 1257–58.

"Materials Research Issues in Superconducting Levitation and Suspension as Applied to Magnetic Bearing," F. C. Moon and J. R. Hull, Proceedings of the 25th Intersociety Energy Conversion Engineering Conference, vol. 3, Aug. 12–17, 1990, pp. 425–431.

"Amplitude Dependence of Magnetic Stiffness in Bulk High–Temperature Superconductors," Basinge et al, *Applied Physics Letter* 57(27) 31 Dec. 1990, pp. 2942–2944.

"Magnetic bearings using high–temperature superconductors: Some pratical considerations," Weinber et al, *Supercond. Sci. Technology* 3 (1990) pp. 381–388.

"Stability Projections for High Temperature Superconductors," Laquer et al, *IEEE Transactions On Magnetics*, vol. 25, No. 2, Mar. 1989.

"Levitation Force and Magnetic Stiffness In Bulk High–Temperature Superconductors," Chang et al, *J. Appl. Phys.* 67(9) 1 May 1990, pp. 4358–4360.

"Phenomenology of Forces Acting Between Magnets and Superconductors," Hull et al, Proceedings of the 25th Intersociety Energy Conversion Engineering Conference, vol. 3, Aug. 12–17, 1990, pp. 43—437.

"Characterization of Composite High Temperature Superconductors For Magnetic Bearing Applications," Weinberger et al, Applied Superconductivity Conf., Snowmass Village, CO, Sep. 24–28, 19 Published Jan. 17, 1991.

*Primary Examiner*—Steven L. Stephan
*Assistant Examiner*—Elvin G. Enad
*Attorney, Agent, or Firm*—Reinhart, Boerner, Van Deuren, Norris & Rieselbach, s.c.

[57] ABSTRACT

An apparatus and method for reducing magnetic field inhomogeneities which produce rotational loss mechanisms in high temperature superconducting magnetic bearings. Magnetic field inhomogeneities are reduced by dividing high temperature superconducting structures into smaller structures, and arranging the smaller structures into tiers which stagger the magnetic field maximum locations of the smaller structures.

16 Claims, 6 Drawing Sheets

OPTIMIZATION OF SUPERCONDUCTING TILING PATTERN FOR SUPERCONDUCTING BEARINGS

CONTRACTUAL ORIGIN OF THE INVENTION

The United States Government has rights in this invention pursuant to Contract No. W-31-109-ENG-38 between the U.S. Department of Energy and The University of Chicago, representing Argonne National Laboratory.

BACKGROUND OF THE INVENTION

The present invention generally relates to magnetic bearing designs incorporating high-temperature superconductors suitable for a variety of applications such as flywheel energy storage. More particularly, the present invention relates to magnetic beating designs including a permanent magnet assembly rotating above an array of high temperature superconductor files. Methods and apparatus are disclosed that optimize the arrangement of the high temperature superconductors so that the magnetic field that the rotating magnet experiences is more homogeneous. The increased field homogeneity reduces the eddy currents induced in the permanent magnet and improves the efficiency of the bearing. The high temperature superconductors are vertically stacked in a brickwall configuration in the preferred embodiments.

Storage of electrical energy is useful in a number of applications. Diurnal storage of electricity is important to electric utilities in order to efficiently utilize base load generating plants and to meet the varying load demands of their customers. For example, base-load plants can charge the storage units at night when demand is low, and then peak demands can be met by discharging the storage during the peak hours.

Energy storage can also play a substantial role in eliminating or postponing the installation of power lines with larger capacity. Power can be transmitted at night to a substation or user energy storage unit when demand is low, and then during peak power times, the energy storage units can be discharged. The placement of these energy storage units can occur in various parts of the electrical distribution system: utility parks where large amounts of energy can be stored; in tandem with photovoltaic or wind energy generation facilities that are time dependent; substation units; individual companies and houses. Energy storage units can be used on electric vehicles such as cars and buses, or as wayside energy storage for electric trains.

Flywheels are often considered for energy storage application. Their primary advantages are modularity, high energy storage density (Wh/kg), and high efficiency input and output of electrical energy. The ability to produce high strength flywheel rotors and the ability to efficiently transfer energy in and out of a flywheel are well known and will not be discussed herein.

The primary disadvantage of conventional flywheels is inefficiency in standby mode. These losses occur because the bearings that support the flywheel structure have high losses. High temperature superconductor bearings constructed in accordance with the invention have very low rotational loss and enable standby losses in flywheels to be 0.1%/hr or less. The high temperature superconductor bearings disclosed herein provide passive stability in all directions, i.e., they provide a positive stiffness in all displacement directions. Further, these novel designs allow rotational motion with very low friction.

A significant loss mechanism associated with a high temperature superconducting bearing is eddy currents. These eddy currents arise any time a normal conductor experiences a change in magnetic field. For high temperature superconducting bearings, the loss occurs as a component of drag torque that increases linearly with velocity. It was discovered by experiments in the inventors laboratory that some eddy currents occur in the rotating permanent magnet as a result of the discreteness of the high temperature superconductor elements of the array.

The high temperature superconductor elements contain gains that become magnetized and produce a levitating force on the permanent magnet. Unlike a permanent magnet, in which the magnetization is essentially uniform across the grain, the magnetization peaks toward the center of the high temperature superconductor gain (hereinafter called the "magnetic field maximum location"). To achieve large levitation pressure, large high temperature superconductor grains are desired. However, the larger the high temperature superconductor grain, the larger the peaking of the magnetization in the high temperature superconductor, and the more inhomogeneous the magnetic field that the permanent magnet experiences when it rotates over the high temperature superconductor.

This magnetic field inhomogeneity produces conflicting demands on the design of the high temperature superconductor gains. The gains should be large for large levitation pressure, but the grains should be small to produce a more homogeneous field on the permanent magnet. If one gigantic high temperature superconductor grain could be produced (a large single crystal), the homogeneity problem in the high temperature superconductor could be solved. The ability to produce such a single crystal is not currently available.

Eddy currents can also be produced due to inhomogeneities in the magnetic field of the permanent magnet. It is desirable to eliminate these eddy currents as well, although significant improvements in the homogeneity of the magnetic field produced by the high temperature superconductors yield significantly lower rotational losses.

Eddy current losses are also produced when an alternating current magnetic field is superimposed onto a direct current magnetic field. The effect of the eddy current loss on rotational drag is proportional to the product $B_{avg}B_{ac}$, where $B_{avg}$ is the average dc field and $B_{ac}$ is the amplitude of the magnetic field ac inhomogeneity superimposed on the dc field. Prior art designs have not succeeded in reducing these rotational losses to acceptable levels.

It is therefore an object of the invention to provide an improved low-loss bearing and method of use using a tiled array of high temperature superconductors.

It is another object of the invention to provide a novel high-efficiency flywheel energy storage device and method of use.

It is a further object of the invention to provide an improved rotational device and method of use utilizing large high temperature superconductor grains to achieve large levitation pressure, but to arrange these grains and high temperature superconductor array elements in such a way that the production of eddy currents in a rotating permanent magnet is minimized.

It is a still further object of the invention to provide a novel superconducting magnetic bearing and method of use using a plurality of superconductor pellets arranged in a staggered fashion to minimize magnetic field inhomogeneity.

It is yet another object of the invention to provide an improved superconducting magnetic bearing and method of use including superconducting material structures which are subdivided and arranged in a staggered arrangement.

It is a further object of the invention to provide a novel staggered, brickwall arrangement and method of use of superconducting material structures which reduce magnetic field inhomogeneity.

Other advantages and features of the invention, together with the organization and the manner of operation thereof, will become apparent from the following detailed description when taken in conjunction with the accompanying drawings, wherein like elements have like numerals throughout the drawings.

DETAILED DESCRIPTION OF PREFERRED EMBODIMENTS

Figure 1A:
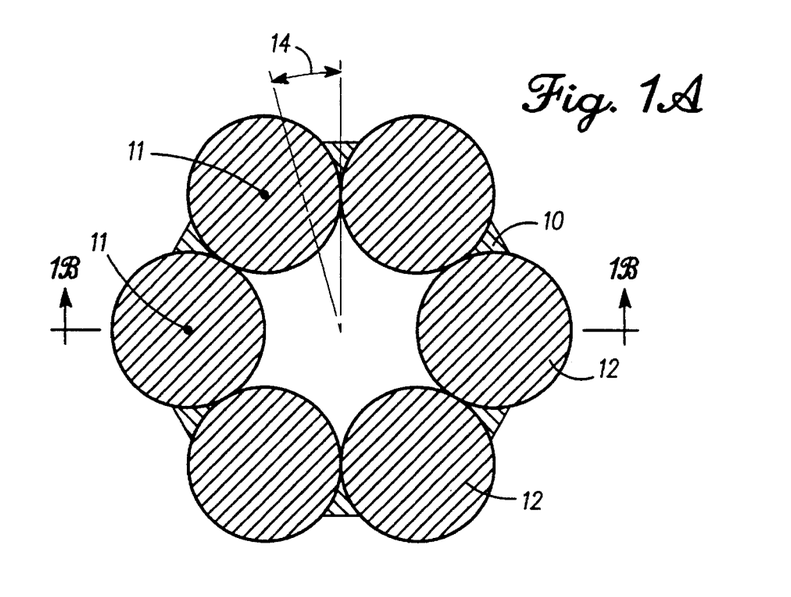
FIGS. 1A and 1B illustrate bottom and cross-sectional views, respectively, of a permanent magnet ring levitated over high temperature superconductor pellets.
Figure 1B:
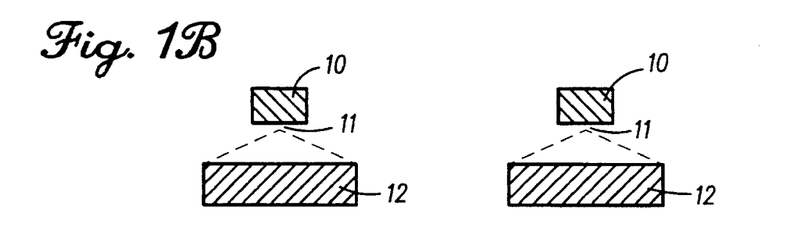

Referring to the figures and more particularly to FIGS. 1A and 1B, a permanent magnet ring 10 is levitated over six high temperature superconductor pellets 12. While a circular shape for the pellets 12 is described for nonlimiting illustrative purposes, it will be apparent that a variety of shapes such as disks, hexagons or cubes can be used equivalently. In this most preferred embodiment of the invention, each of the high temperature superconductor pellets 12 can comprise a single grain, yielding the equivalent of six discrete magnetic dipoles producing a magnetic field that acts on the permanent magnet ring 10. As shown in FIG. 1B, a magnetic field maximum location 11 is located over the center of the high temperature superconductor pellet 12. If each of the high temperature superconductor pellets 12 comprises a finite number of grains, then there are more dipoles, each dipole corresponding to a single gain. In this preferred embodiment, there is also an effect due to the lack of high temperature superconductor under all of the permanent magnet ring 10 which is less significant to the invention and is therefore not discussed in detail.

Figure 2A:
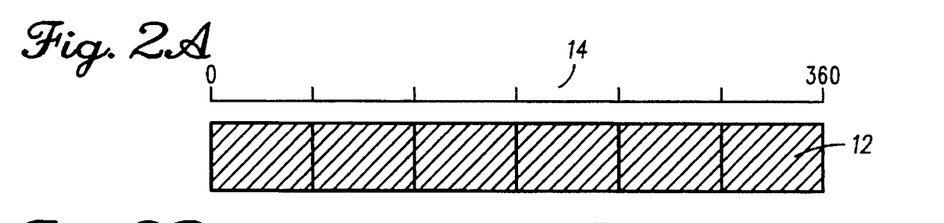
FIG. 2A shows a superconductor geometry with large superconductor pellets.
Figure 2B:
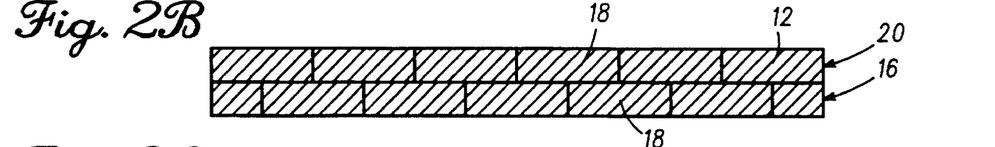
FIG. 2B illustrates a superconductor configuration in which pellets are cut to form disks for forming a brickwall configuration and the bottom tier of the array is rotated by thirty degrees azimuthal direction.
Figure 2C:
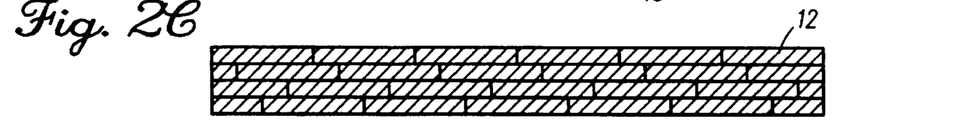
FIG. 2C shows further subdividing of the superconductor structures with further rotation of the subsequent layers.

To improve the homogeneity of the field experienced by the rotating permanent magnet ring 10, the configuration shown in FIGS. 2B and 2C can be utilized. The high temperature superconductor configuration is shown relative to the azimuthal angle 14 at some radius where the edges of the high temperature superconductor pellets 12 touch.

In the embodiment of FIG. 2A, the height of the high temperature superconductor pellet 12 is preferably six mm. FIG. 2B shows another preferred embodiment in which each of the high temperature superconductor pellets 12 is cut along a horizontal plane and the bottom tier 16 of the array is rotated by thirty degrees in the azimuthal direction, so that the center of each element 18 of the top tier 20 is located between the edges of the two elements 18 in the bottom tier 16. Calculations show that the magnetic field inhomogeneity of the configuration shown in FIG. 2B is about half that of FIG. 2A when the levitation height (the bottom of the permanent magnet ring 10 above the top of the high temperature superconductor pellet 12 or element 18) is six mm; likewise, about one-quarter that of the FIG. 2A configuration when the levitation height is nine mm; and about one-sixth that of FIG. 2A configuration when the levitation height is twelve mm. An increase in the average field is seen by the permanent magnet ring 10 which indicates that the levitation pressure is larger for the configuration shown in FIG. 2B relative to the configuration of FIG. 2A.

Figure 3A:
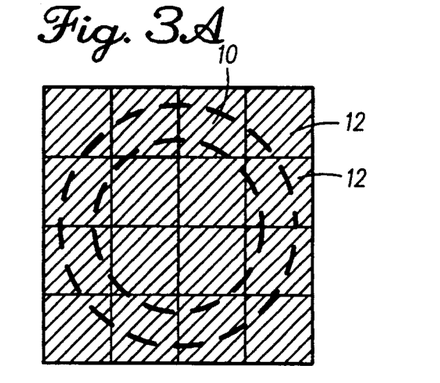
FIGS. 3A and 3B illustrate matrices of square superconductor pellets which are also tiled.
Figure 3B:
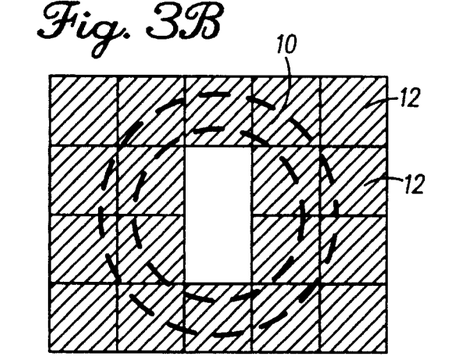

An alternative preferred embodiment in FIG. 3 files the area under the ring in square pellets 12. Each of the high temperature superconductor pellets 12 (hereinafter "pellets 12") can have square or circular grains therein. A brickwall pattern of a two-tier array of the pellets 12 can then be used advantageously. Other variations of the staggering of each layer or tier can also be used in accordance with this form of the invention.

Another form of the invention uses substantially cylindrical pellets 12 which are cut along an axis of the cylinder to form substantially rectangular pieces which are stacked in tiers. It will be apparent to one skilled in the art that other shapes can be used for the pellets 12 and that other cutting orientations can be used equivalently in accordance with this form of the invention.

The magnetic field was calculated from a uniformly magnetized array of six cylindrically shaped ones of the pellets 12, each being one and one-half inches in diameter with a height of six mm. The six pellets 12 were uniformly spaced around a central circle of one and one-half inches in diameter. The magnetic field was calculated at a height of six, nine, and twelve mm above the top surface of the pellets 12. The field was calculated at diameters of two and one-half, three, and three and one-half inches, corresponding to the inside, middle, and outside diameter of a permanent magnet ring 10 that had been used in previous experiments. A uniform magnetization of the pellets 12 of 0.1 Tesla was assumed, approximately what would be required to levitate the permanent magnet ring 10. Uniform magnetization is equivalent to superconductors with small grains, essentially what were used in the experiments. If the grain size were large, then the inhomogeneity would be larger than calculated.

Figure 4:
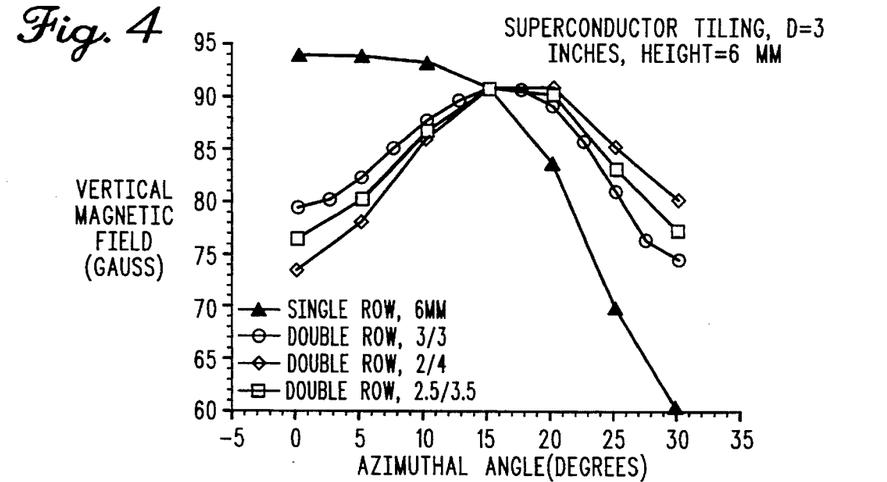
FIG. 4 shows vertical magnetic field as a function of azimuthal angle at a diameter of three inches and a height of six millimeters.
Figure 5:
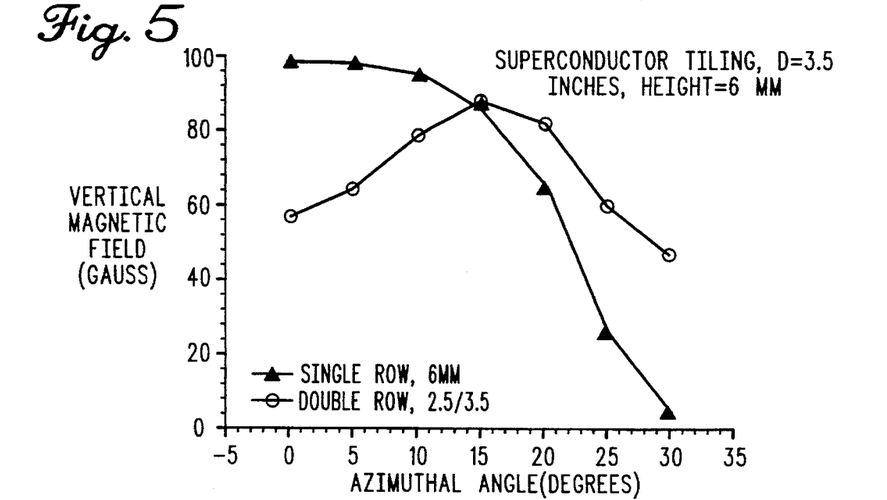
FIG. 5 illustrates vertical magnetic field as a function of azimuthal angle at a diameter of three and one-half inches and a height of six millimeters.
Figure 6:
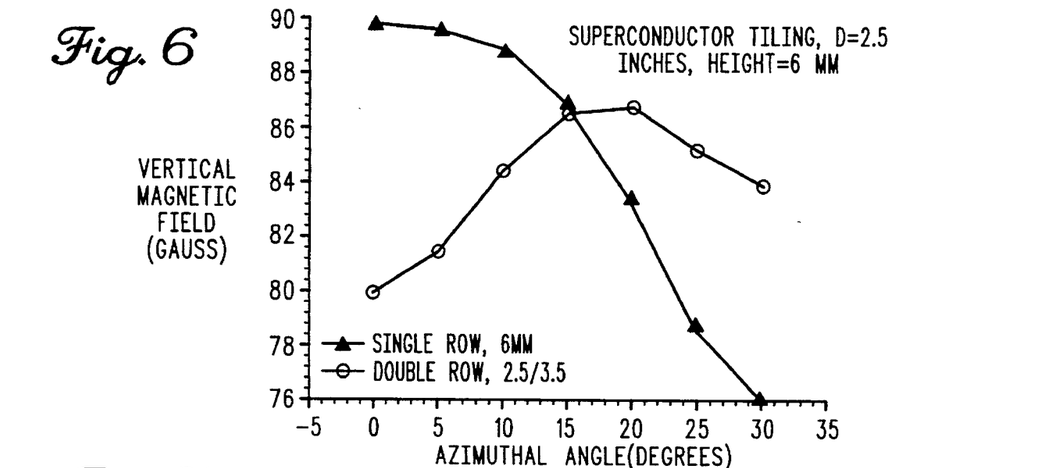
FIG. 6 shows vertical magnetic field as a function of azimuthal angle at a diameter of two and one-half inches and a height of six millimeters.
Figure 7:
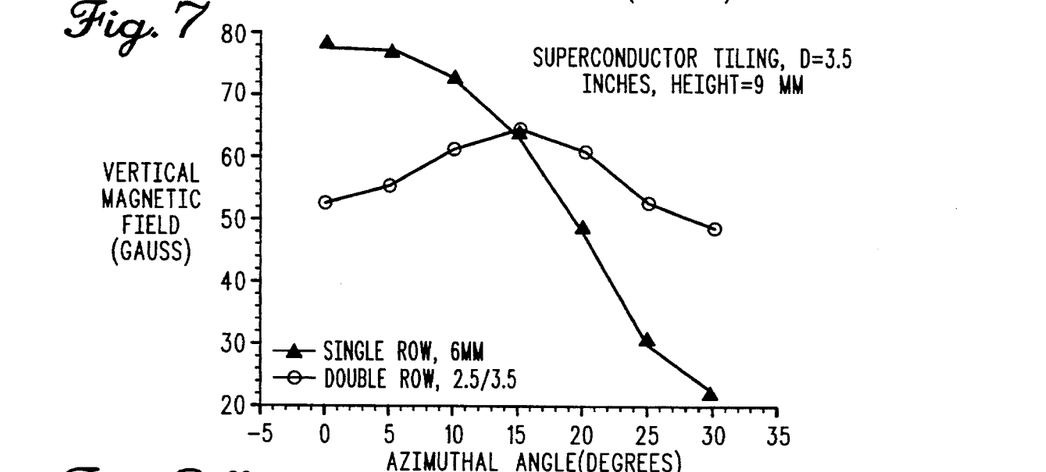
FIG. 7 illustrates vertical magnetic field as a function of azimuthal angle at a diameter of three and one-half inches and a height of nine millimeters.
Figure 8:
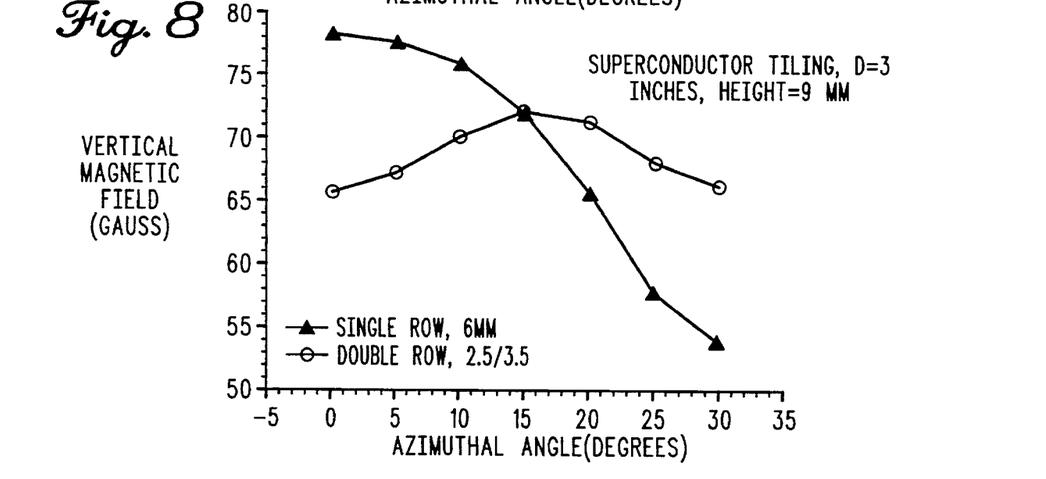
FIG. 8 shows vertical magnetic field as a function of azimuthal angle at a diameter of three inches and a height of nine millimeters.
Figure 9:
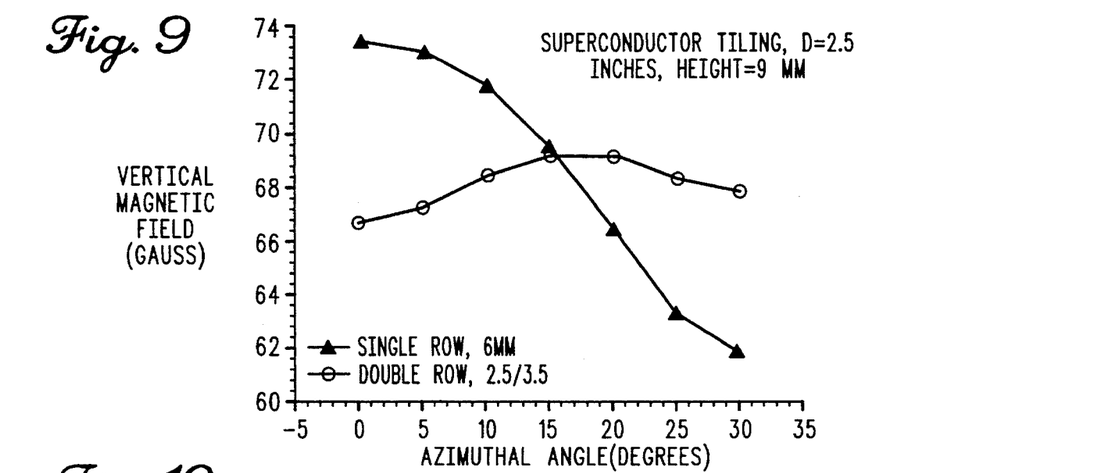
FIG. 9 illustrates vertical magnetic field as a function of azimuthal angle at a diameter of two and one-half inches and a height of nine millimeters.
Figure 10:
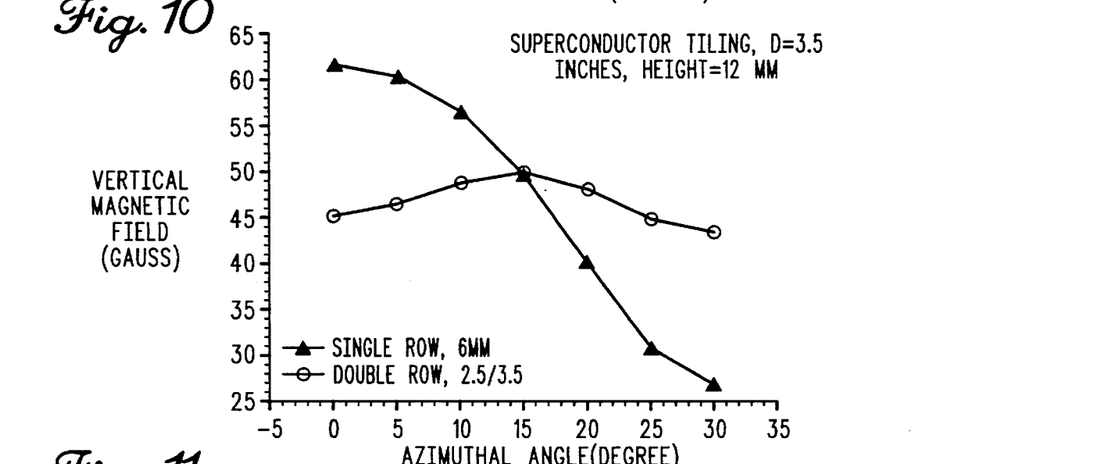
FIG. 10 shows vertical magnetic field as a function of azimuthal angle at a diameter of three and one-half inches and a height of twelve millimeters.
Figure 11:
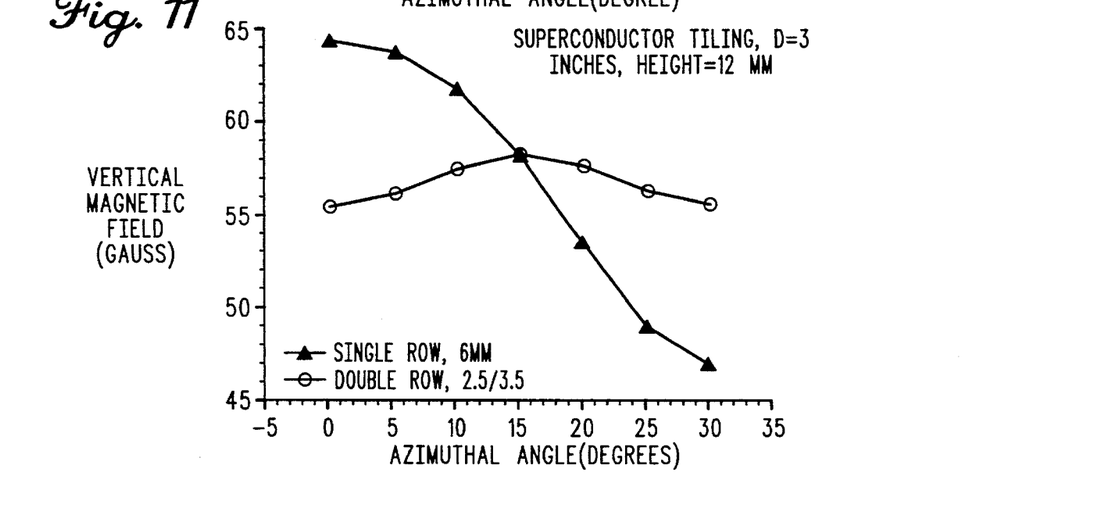
FIG. 11 illustrates vertical magnetic field as a function of azimuthal angle at a diameter of three inches and a height of twelve millimeters.
Figure 12:
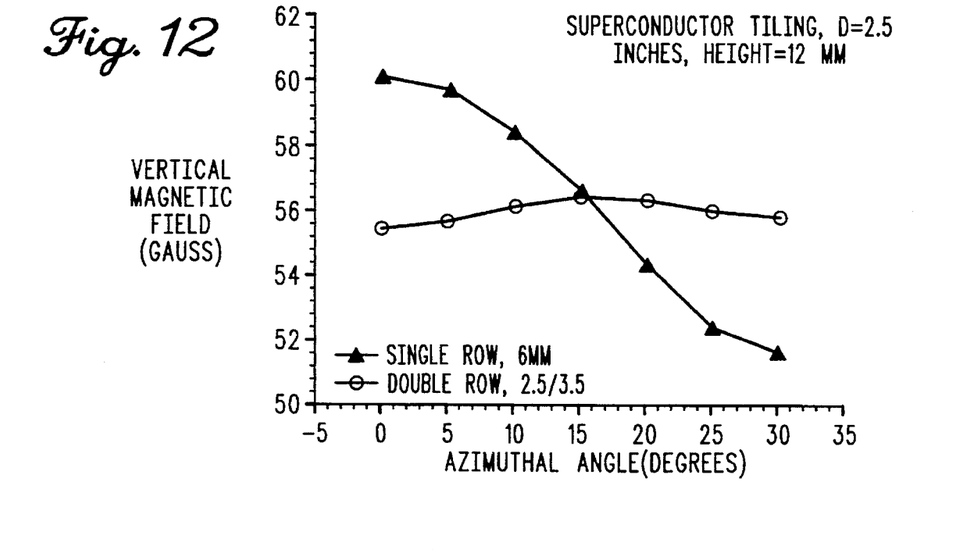
FIG. 12 shows vertical magnetic field as a function of azimuthal angle at a diameter of two and one-half inches and a height of twelve millimeters.

FIG. 4 shows the magnetic field calculated at a diameter of three inches and height equal to six mm, corresponding to the bottom of the permanent magnet ring 10 at the middle, i.e., the bottom of the permanent magnet ring 10 is assumed to be six mm above the top surface of the pellets 12 or the elements 18. The legend denotes a single row of the pellets 12 six mm high, a double tier in which the top tier 20 is three mm high and the bottom tier 16 is three mm high, a double tier in which the top tier 20 is two mm high and the bottom tier 16 is four mm, and a double tier in which the top tier 20 is two and one-half mm high and the bottom tier 16 is three and one-half mm high. In comparing the double tier alternatives, FIG. 4 shows that the two and one-half/three and one-half mm (top/bottom configuration) arrangement provides the best homogeneity, which is determined by taking the difference between the maximum and minimum value over the 30° azimuthal range. The system is symmetric with 30° as the repeat range. In all further calculations (as illustrated by FIGS. 5–12), only the single tier is compared with the two and one-half/three and one-half mm double tier. In all cases, the double tier arrangement significantly improved the magnetic field homogeneity over the single tier. Further, it was observed that homogeneity increased significantly as the measurement height increased.

When the bottom tier 16 had a height of three and one-half mm and the top tier 20 had a height of two and one-half mm, the minimum (i.e., best) field homogeneity was achieved. The reason for this optimal arrangement in which the top tier 20 is thinner than the bottom tier 16 occurs because the magnetic field of a given magnet falls off with distance. Because the bottom tier 16 is further from the permanent magnet ring 10 than the top tier 20, the bottom tier 16 must be thicker than the top tier 20 to produce an equivalent field. Subdividing the pellets 12 further as shown in FIG. 2C can yield even greater field homogeneity than the field produced by the structure shown in FIG. 2B. In this multi-tiered arrangement the best homogeneity will occur when the top tier 20 is the thinnest and the layers become progressively thicker further from the permanent magnet ring 10. Accordingly, this preferred embodiment of the invention enables rotational losses to be substantially reduced while increasing levitation forces.

It was hypothesized that an HTS array 22 (comprised, for example, of the pellets 12) will produce a magnetic field inhomogeneity at a rotating permanent magnet (e.g. a permanent magnet ring) that will result in eddy currents dissipated in the permanent magnet. It was thought that a significant fraction of the eddy currents that were seen in previous experiments came from this source. To test this hypothesis, the magnetic field-was measured at a fixed spot immediately beneath the permanent magnet ring 10 as it rotated above the HTS array 22. With a vertical gap of ten mm between the top of the HTS array 22 and the bottom of the permanent magnet ring 10, the result was an azimuthal variation of almost 20 Gauss in the vertical component of the magnetic field.

Figure 13A:
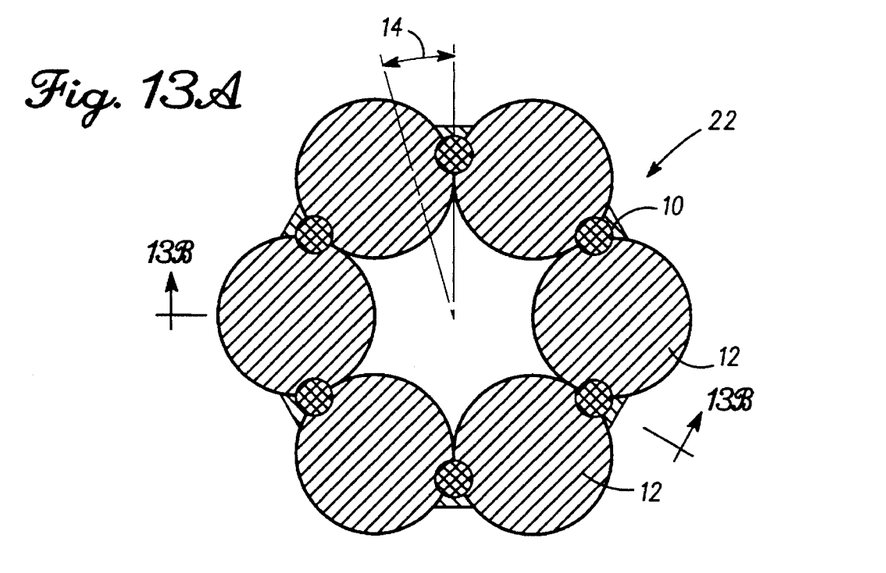
FIGS. 13A and 13B illustrate bottom and cross-sectional views, respectively, of a permanent magnet ring levitated over high temperature superconductor pellets and permanent magnet shims.
Figure 13B:
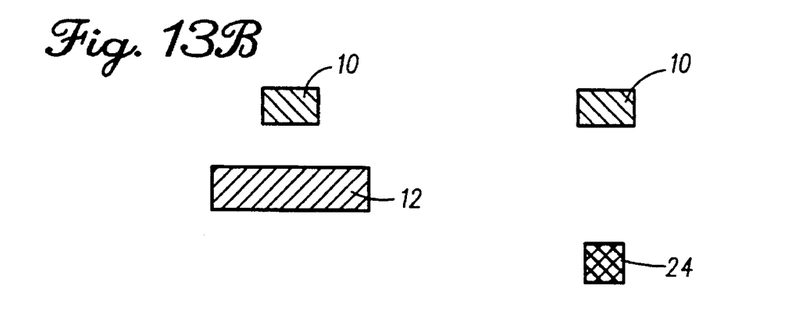

As shown in FIG. 13 an array of six permanent magnet shims 24 (hereinafter "shim 24") was located outside of the rotating permanent magnet ring 10. These shims 24 sat in the vacuum chamber on top of the cryogenic chamber and were designed to produce an azimuthal inhomogeneity in the magnetic field that was approximately that of the HTS array 22. It was difficult to quantitatively match these inhomogeneities because they varied significantly over the height and radial width of the permanent magnet ring 10. The shims 24 were one-half inch in diameter and one-half inch high and spaced at sixty degree intervals. The shims 24 were located at approximately the same vertical height as the rotating permanent magnet ring 10.

Two spindown tests were conducted, one with the shim 24 present and one with it absent. In both cases, the rotating permanent magnet ring 10 was at about nine and one-half mm in height above the HTS array 22. In both experiments, approximately the same zero-velocity coefficient of friction was obtained, i.e., $3.3 \times 10^{-6}$. This value is in reasonable agreement with previous values obtained at this height with another system. To determine the effect that eddy currents had on the system, the derivative of the coefficient of friction with respect to the rim velocity of the permanent magnet ring 10 was calculated. Without the array of the shims 24 present, the value was $1.9 \times 10^{-7}$ s/m. With the shim 24 present this value was $3.3 \times 10^{-7}$ which almost doubles the eddy current contribution to the loss. This provided strong evidence that the HTS array 22 caused substantial eddy currents in the rotating permanent magnet ring 10. Brickwalling the HTS array 22 in accordance with one form of the invention to reduce the magnetic field inhomogeneity can therefore substantially reduce these eddy current losses.

Another alternative embodiment of this invention uses hexagonal tiling with brickwall staggering similar to the structure illustrated in FIG. 3. Instead of brickwalling the HTS array 22, or in addition to brickwalling the HTS array 22, it can be beneficial to improve the magnetic field azimuthal homogeneity by using the permanent magnet array of the shims 24 in combination with the HTS array 22 (see FIG. 13). The objective is to make the magnetic field that the rotating permanent magnet ring 10 experiences be as homogeneous as possible. The ability to achieve this using HTS components is somewhat limited by the granularity of the HTS, especially if large grains are used to get large levitation pressure. Permanent magnets would not suffer from this limitation because the magnetization of a permanent magnet is independent of grain size. The field homogeneity of the HTS array 22 can be made homogeneous by the use of a permanent magnet shim 24. An example of this embodiment is shown in FIG. 13, in which an array of the shims 24 is located below the HTS array 22.

Figure 14A:
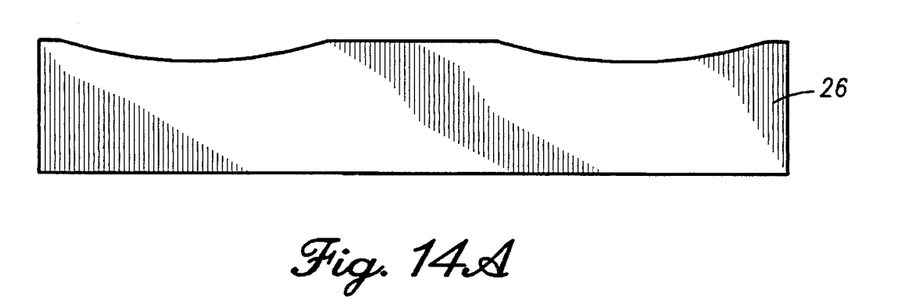
FIG. 14A shows a continuous permanent magnet having varying cross-sectional area and FIG. 14B illustrates a continuous permanent magnet having varying magnetization.
Figure 14B:
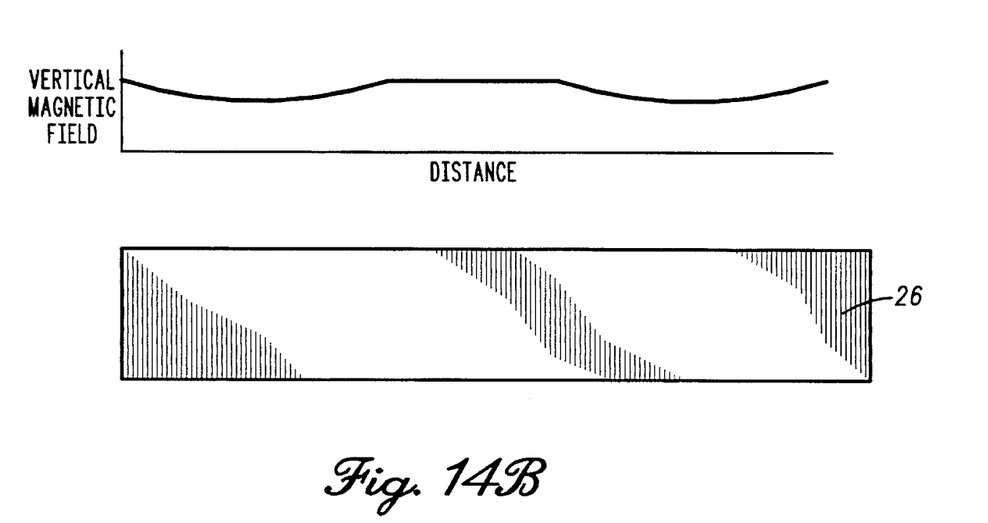

The geometry of the permanent magnet ring 10 will determine how many of the pellets 12 are needed. It is clear that the same technique of staggering the tiers in a brickwall geometry could be used with any number of the pellets 12 around the circumference of the permanent magnet ring 10. The shims 24 can be located inside or outside the HTS array 22. The shims 24 can take on a more complicated geometry as well. Many permanent magnets of different size and magnetization can be used. Further, a continuous piece permanent magnet 26 can be used where the magnetization is constant, and the thickness is varied over the cross sectional area of the bearing as shown in FIG. 14A to provide the most homogenous magnetic field experienced by the rotating permanent magnet ring 10. (A form of the continuous piece permanent magnet 26 can also be used where the magnetization is varied over a substantially constant cross sectional area portion as shown in FIG. 14B to achieve maximum field homogeneity.

While preferred embodiments have been illustrated and described, it should be understood that changes and modifications can be made therein without departing from the invention in its broader aspects. Various features of the invention are defined in the following claims.

What is claimed is:

1. A high temperature superconductor bearing, comprising:

a permanent magnet levitated by a plurality of high temperature superconductor structures, said high temperature superconductor structures being arranged in a plurality of tiers, and said high temperature superconductor structures in each tier having their magnetic field maximum locations offset from magnetic field maximum locations of said high temperature superconductor structures in adjacent tiers, thereby smoothing the overall magnetic field of said plurality of HTSC structures.

2. The bearing as defined in claim 1 wherein said high temperature superconductor structures increase in thickness by tier as the distance between the high temperature superconductor structures and said permanent magnet increases.

3. The bearing as defined in claim 1 wherein said high temperature superconductor structures include a top tier and a bottom tier of which said top tier is thinner and closer to said permanent magnet than said bottom tier.

4. The bearing as defined in claim 1 wherein said permanent magnet comprises a ring.

5. The bearing as defined in claim 1 wherein said high temperature superconductor structures form a multi-tiered ring.

6. The bearing as defined in claim 1 wherein said high temperature superconductor structures form a multi-tiered structure which is substantially square.

7. The bearing as defined in claim 6 wherein said multi-tiered structure is substantially square along a plane perpendicular to said high temperature superconductor bearing's axis of rotation.

8. The bearing as defined in claim 1 wherein said high temperature superconductor structures form a multi-tiered substantially hexagonal structure.

9. The bearing as defined in claim 1 wherein said high temperature superconductor structures are divided into smaller superconductor structures and are arranged in tiers which stagger magnetic field maximum locations of said smaller superconductor structures.

10. A method of reducing magnetic field inhomogeneity in a high temperature superconducting bearing, comprising the steps of:

dividing a high temperature superconductor structure into smaller structures, each smaller structure having its own magnetic field maximum location;

arranging said smaller structures into at least one top and at least one bottom tier;

staggering said tiers so that the magnetic field maximum locations of said smaller structures are offset from the magnetic field maximum locations of said smaller structures located in at least one adjacent tier; and levitating a magnetic structure with said high temperature superconductor.

11. The method as defined in claim 10 wherein said bottom tier is thicker than said top tier.

12. The method as defined in claim 10 wherein said permanent magnet comprises a ring.

13. The method as defined in claim 10 wherein said high temperature superconductor structures form a multi-tiered ring.

14. The method as defined in claim 10 wherein said high temperature superconductor structures form a multi-tiered structure which is substantially square.

15. The method as defined in claim 14 wherein said multi-tiered structure is substantially square along a plane perpendicular to said high temperature superconductor bearing's axis of rotation.

16. The method as defined in claim 10 wherein said high temperature superconductor structures form a multi-tiered substantially hexagonal structure.

* * * * *